United States Patent
Datta et al.

(10) Patent No.: US 12,514,481 B2
(45) Date of Patent: Jan. 6, 2026

(54) SYSTEM AND METHOD FOR ADAPTIVE DATA ACQUISITION FOR HELICAL CARDIAC COMPUTED TOMOGRAPHY

(71) Applicant: GE Precision Healthcare LLC, Waukesha, WI (US)

(72) Inventors: Arka Datta, Pewaukee, WI (US); John Howard Londt, Oconomowoc, WI (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 294 days.

(21) Appl. No.: 18/466,115

(22) Filed: Sep. 13, 2023

(65) Prior Publication Data

US 2025/0082248 A1 Mar. 13, 2025

(51) Int. Cl.
*A61B 5/352* (2021.01)
*A61B 6/00* (2024.01)
*A61B 6/03* (2006.01)
*A61B 6/50* (2024.01)

(52) U.S. Cl.
CPC .............. *A61B 5/352* (2021.01); *A61B 6/032* (2013.01); *A61B 6/503* (2013.01); *A61B 6/541* (2013.01)

(58) Field of Classification Search
CPC ......... A61B 5/352; A61B 6/027; A61B 6/032; A61B 6/503; A61B 6/541
USPC .......................................... 378/4, 8; 382/131
See application file for complete search history.

(56) References Cited

U.S. PATENT DOCUMENTS

| | | | |
|---|---|---|---|
| 6,560,309 B1 * | 5/2003 | Becker | A61B 6/541 378/95 |
| 6,712,386 B2 | 3/2004 | Fischer | |
| 7,142,703 B2 | 11/2006 | Kaufman et al. | |
| 7,421,057 B2 | 9/2008 | Watanabe | |
| 7,545,903 B2 | 6/2009 | Köhler et al. | |
| 7,848,790 B2 | 12/2010 | Pan et al. | |
| (Continued) | | | |

FOREIGN PATENT DOCUMENTS

DE 102007029731 A1 * 1/2009 ............. A61B 6/032

OTHER PUBLICATIONS

Cademartiri et al., "Improving Diagnostic Accuracy of MDCT Coronary Angiography in Patients with Mild Heart Rhythm Irregularities Using ECG Editing," American Roentgen Ray Society, AJR vol. 186, Mar. 2006, 5 pgs.

*Primary Examiner* — Boniface N Nganga
(74) *Attorney, Agent, or Firm* — Fletcher Yoder, P.C.

(57) ABSTRACT

A method includes obtaining an electrocardiogram (ECG) signal during a scan of a heart of a subject with a CT scanner. The method includes calculating temporal R-R electrocardiogram interval measurements from the ECG signal. The method includes monitoring whether any irregular cardiac cycles are detected in the temporal R-R electrocardiogram interval measurements. The method includes determining whether an initial Z coverage of the scan is sufficient for obtaining an artifact free image of the heart at a target phase when one or more irregular cardiac cycles are detected. The method includes determining a required Z coverage to obtain the artifact free image of the heart at the target phase when the initial Z coverage is not sufficient. The method includes initiating a rescan of the heart to obtain the required Z coverage while continuing both to obtain the ECG signal and to monitor for any irregular cardiac cycles.

20 Claims, 10 Drawing Sheets

(56) References Cited

U.S. PATENT DOCUMENTS

| | | |
|---|---|---|
| 7,885,374 B2 | 2/2011 | Noshi et al. |
| 8,155,264 B2 | 4/2012 | Lessick |
| 9,084,542 B2 | 7/2015 | Bouhnik et al. |
| 9,622,717 B2 | 4/2017 | Londt et al. |
| 11,130,523 B2 | 9/2021 | Kataoka et al. |
| 2004/0077941 A1* | 4/2004 | Reddy ............... A61B 5/349 |
| | | 600/509 |
| 2008/0193003 A1* | 8/2008 | Shechter ............ A61B 6/4085 |
| | | 382/131 |
| 2012/0082291 A1* | 4/2012 | Allmendinger ...... A61B 6/4014 |
| | | 378/11 |
| 2017/0209113 A1 | 7/2017 | Jackson et al. |

\* cited by examiner

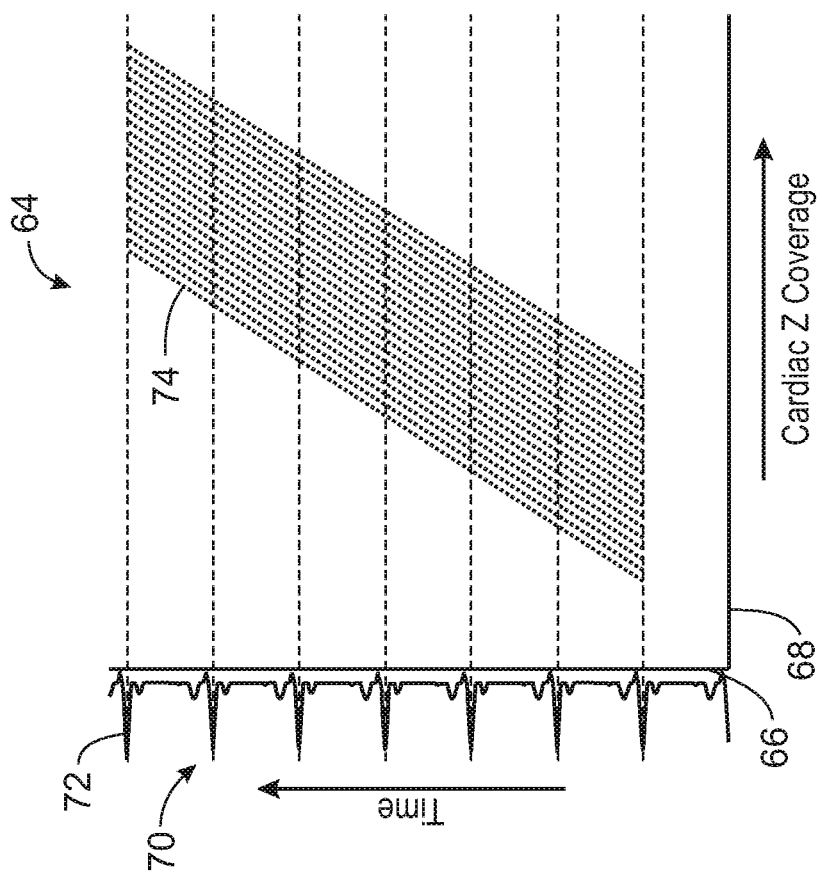
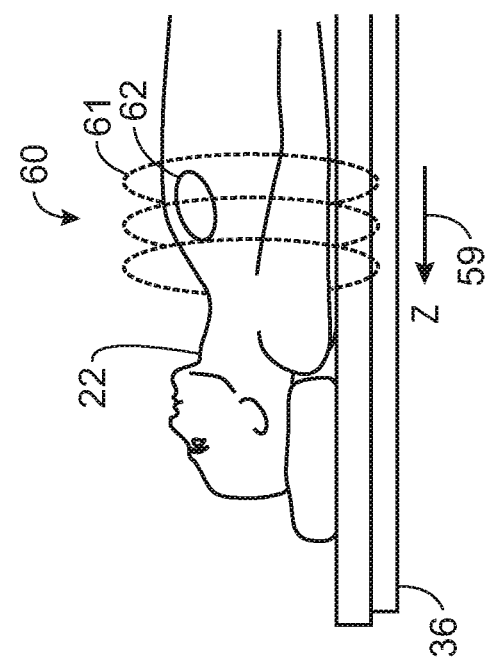
FIG. 4
FIG. 3

SYSTEM AND METHOD FOR ADAPTIVE DATA ACQUISITION FOR HELICAL CARDIAC COMPUTED TOMOGRAPHY

BACKGROUND

The subject matter disclosed herein relates to medical imaging systems and, more particularly, to a system and a method for adaptive data acquisition for helical cardiac computed tomography.

In computed tomography (CT), X-ray radiation spans an object or a subject of interest being scanned, such as a human patient, baggage, or other object, and a portion of the radiation impacts a detector where the image data is collected. In digital X-ray systems a photodetector produces signals representative of the amount or intensity of radiation impacting discrete pixel regions of a detector surface. The signals may then be processed to generate an image that may be displayed for review. In the images produced by such systems, it may be possible to identify and examine the internal structures and organs within a subject's body. In CT imaging systems a detector array, including a series of detector elements or sensors, produces similar signals through various positions as a gantry is displaced around a subject or object being imaged, allowing volumetric image reconstructions to be obtained.

Cardiac conditions are one of the most life-threatening vascular disorders and require prompt identification and diagnosis. The occurrence of an irregular beat is not infrequent even in normal patients and is more frequent with some conditions (e.g., ischaemic cardiomyopathy). The presence of a premature or extended cardiac cycle introduces image artifacts as it may affect having sufficient image quality over the entire Z coverage of the prescribed anatomy (e.g. heart). Artifact free images are necessary, given the time critical nature of the prognosis. Currently, cardiac helical pitch is set conservatively so each heartbeat may be effectively scanned twice so that if an arrhythmia occurs a single heartbeat may be excluded from reconstruction. This may lead to certain patients receiving a greater overall dose than is necessary during a helical cardiac CT scan.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a computer-implemented method for adaptive data acquisition during a helical cardiac computed tomography (CT) scan session is provided. The computer-implemented method includes obtaining, at a processor, an electrocardiogram (ECG) signal from a subject during a duration of a helical cardiac scan of a heart of the subject with a CT scanner during the helical cardiac CT scan session. The computer-implemented method also includes calculating, via the processor, temporal R-R electrocardiogram interval measurements from the ECG signal during the duration of the helical cardiac CT scan. The computer-implemented method further includes monitoring, via the processor, whether any irregular cardiac cycles are detected in the temporal R-R electrocardiogram interval measurements during the duration of the helical cardiac CT scan. The computer-implemented method even further includes determining, via the processor, during the helical cardiac CT scan whether an initial Z coverage of the helical cardiac CT scan is sufficient for obtaining an artifact free image of the heart at a target phase when one or more irregular cardiac cycles are detected. The computer-implemented method still further includes determining, via the processor, a required Z coverage to obtain the artifact free image of the heart at the target phase when the initial Z coverage is not sufficient. The computer-implemented method yet further includes initiating, via the processor, after the helical cardiac CT scan a helical cardiac CT rescan of the heart of the subject with the CT scanner during the helical cardiac CT scan session to obtain the required Z coverage while continuing both to obtain the ECG signal and to monitor for any irregular cardiac cycles.

In another embodiment, a system for adaptive data acquisition during a helical cardiac computed tomography (CT) scan session is provided. The system includes a memory encoding processor-executable routines. The system also includes a processor configured to access the memory and to execute the processor-executable routines, wherein the processor-executable routines, when executed by the processor, cause the processor to perform actions. The actions include obtaining an electrocardiogram (ECG) signal from a subject during a duration of a helical cardiac CT scan of a heart of the subject with a CT scanner during the helical cardiac CT scan session. The actions also include calculating temporal R-R electrocardiogram interval measurements from the ECG signal during the duration of the helical cardiac CT scan. The actions further include monitoring whether any irregular cardiac cycles are detected in the temporal R-R electrocardiogram interval measurements during the duration of the helical cardiac CT scan. The actions even further include determining during the helical cardiac CT scan whether an initial Z coverage of the helical cardiac CT scan is sufficient for obtaining an artifact free image of the heart at a target phase when one or more irregular cardiac cycles are detected. The actions still further include determining a required Z coverage to obtain the artifact free image of the heart at the target phase when the initial Z coverage is not sufficient. The actions yet further include initiating after the helical cardiac CT scan a helical cardiac CT rescan of the heart of the subject with the CT scanner during the helical cardiac CT scan session to obtain the required Z coverage while continuing both to obtain the ECG signal and to monitor for any irregular cardiac cycles.

In a further embodiment, a non-transitory computer-readable medium, the non-transitory computer-readable medium including processor-executable code that when executed by a processor, causes the processor to perform actions. The actions include obtaining an electrocardiogram (ECG) signal from a subject during a duration of a helical cardiac CT scan of a heart of the subject with a CT scanner during a helical cardiac CT scan session. The actions also include calculating temporal R-R electrocardiogram interval measurements from the ECG signal during the duration of the helical cardiac CT scan. The actions further include monitoring whether any irregular cardiac cycles are detected in the temporal R-R electrocardiogram interval measurements during the duration of the helical cardiac CT scan. The actions even further include determining during the helical cardiac CT scan whether an initial Z coverage of the helical cardiac CT scan is sufficient for obtaining an artifact free image of the heart at a target phase when one or more irregular cardiac cycles are detected. The actions still further include determining a required Z coverage to obtain the artifact free image of the heart at the target phase when the initial Z coverage is not sufficient. The actions yet further include initiating after the helical cardiac CT scan a helical cardiac CT rescan of the heart of the subject with the CT scanner during the helical cardiac CT scan session to obtain the required Z coverage while continuing both to obtain the ECG signal and to monitor for any irregular cardiac cycles.

BRIEF DESCRIPTION OF THE DRAWINGS

These and other features, aspects, and advantages of the present disclosed subject matter will become better understood when the following detailed description is read with reference to the accompanying drawings in which like characters represent like parts throughout the drawings, wherein:

FIG. 3 is a schematic diagram of a helical cardiac CT scan;

FIG. 4 is a graph illustrating a corresponding Z coverage (e.g., cardiac Z coverage) for the helical cardiac CT scan in FIG. 3;

DETAILED DESCRIPTION

Figure 1:
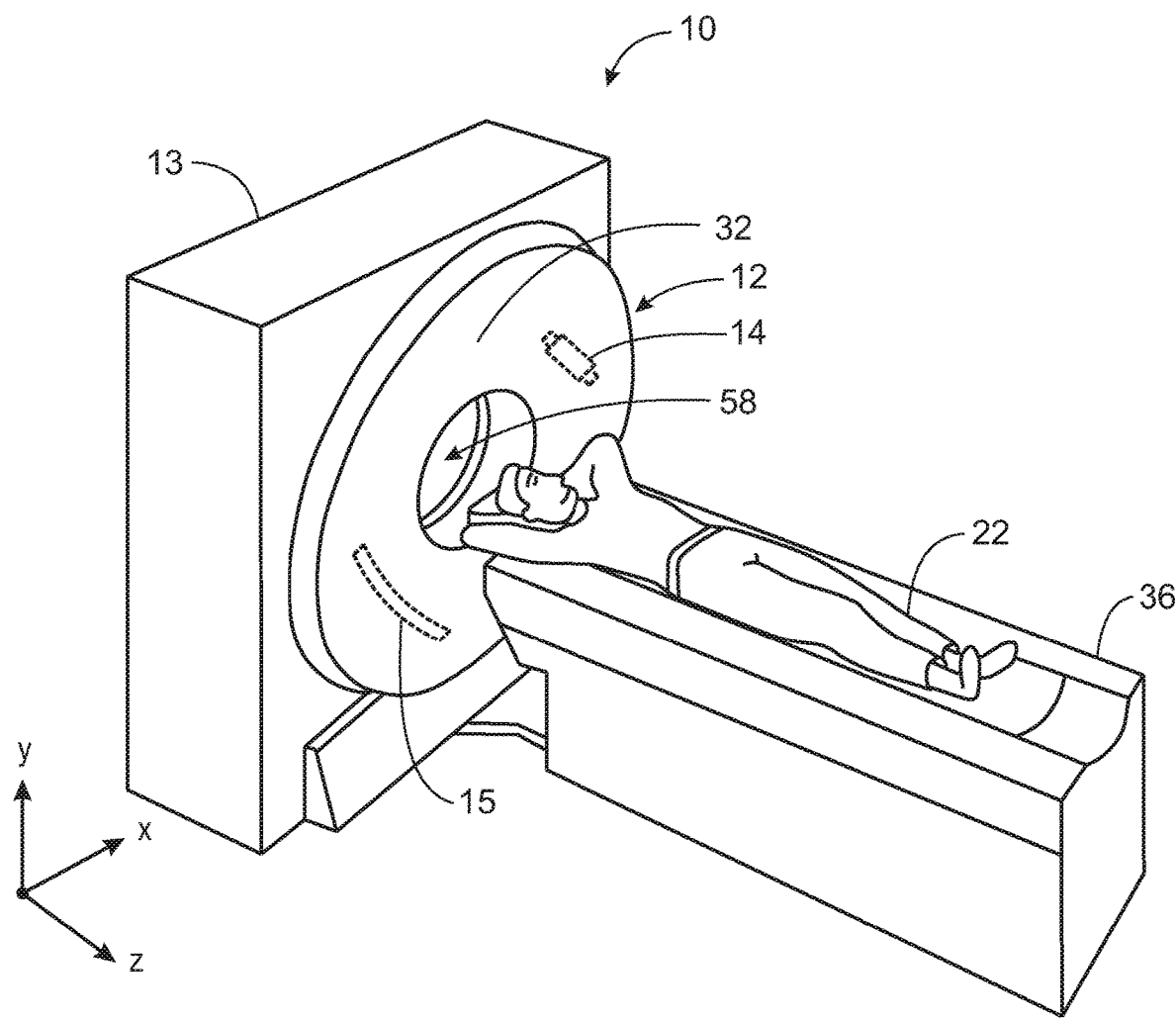
FIG. 1 is a pictorial representation of a CT imaging system, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The present disclosure provides systems and methods for adaptive data acquisition during a helical cardiac computed tomography (CT) scan session. In particular, the disclosed embodiments include obtaining an electrocardiogram (ECG) signal from a subject (e.g., patient) during a duration of a helical cardiac CT scan of a heart of the subject with a CT scanner during the helical cardiac CT scan session. The disclosed embodiments also include calculating temporal R-R electrocardiogram interval measurements from the ECG signal during the duration of the helical cardiac CT scan. The disclosed embodiments further include monitoring whether any irregular cardiac cycles (e.g., premature cycle, extended cycle, or both premature cycle and extended cycle) are detected in the temporal R-R electrocardiogram interval measurements during the duration of the helical cardiac CT scan. The disclosed embodiments even further include determining during the helical cardiac CT scan whether an initial Z coverage (e.g., initial cardiac Z coverage) of the helical cardiac CT scan is sufficient for obtaining an artifact free image of the heart at a target phase (e.g., atrial diastole, atrial systole, ventricular diastole, or ventricular systole) when one or more irregular cardiac cycles are detected. Cardiac Z coverage in a helical cardiac CT scan is determined by a width of a CT detector and the pitch. The disclosed embodiments still further include determining a required Z coverage (e.g., required cardiac Z coverage) to obtain the artifact free image of the heart at the target phase when the initial Z coverage is not sufficient. The disclosed embodiments yet further include initiating (e.g., automatically) after the helical cardiac CT scan a helical cardiac CT rescan of the heart of the subject with the CT scanner during the helical cardiac CT scan session to obtain the required Z coverage while continuing both to obtain the ECG signal and to monitor for any irregular cardiac cycles. In particular, the helical cardiac CT rescan is targeted to acquire the additional Z coverage needed to meet the required Z coverage.

In certain embodiments, when a helical cardiac CT rescan is performed during the same helical cardiac CT scan session, a table of the CT scanner supporting the subject moves the subject in a first direction (e.g., Z or axial direction) through a bore of a gantry of the CT scanner during the helical cardiac CT scan and moves the subject in a second direction through the bore of the gantry during the helical cardiac CT rescan, where the first direction is opposite the second direction. In certain embodiments, when a helical cardiac CT rescan is performed during the same helical cardiac CT scan session, a table of the CT scanner supporting the subject moves the subject in a same direction through a bore of a gantry of the CT scanner during both the helical cardiac CT scan and the helical cardiac CT rescan.

Certain embodiments (when a helical cardiac CT rescan is conducted) include generating one or more reconstructed images based on scan data obtained from both the helical cardiac CT scan and the helical cardiac CT rescan, and applying motion correction to the one or more reconstructed images utilizing ECG data from the ECG signal. Certain embodiments include generating one or more reconstructed images based on scan data obtained from the helical cardiac CT scan when no irregular cardiac cycles are detected, and applying motion correction to the one or more reconstructed images utilizing ECG data from the ECG signal. Certain embodiments include generating one or more reconstructed images based on scan data obtained from the helical cardiac CT scan when the initial Z coverage is sufficient, and applying motion correction to the one or more reconstructed images utilizing ECG data from the ECG signal.

Certain embodiments include obtaining the ECG signal from the subject prior the helical cardiac CT scan, and determining a pitch (e.g., pitch ratio) (i.e., ratio of distance moved by the table (subject) in one rotation of the X-ray source (e.g., one 360 degree gantry rotation) divided by the nominal X-ray beam width (e.g., beam collimation)) for the helical cardiac CT scan prior to the helical cardiac CT scan utilizing a heart rate of the subject derived from the ECG signal. In certain embodiments, determining the pitch for the helical cardiac CT scan includes setting the pitch at a first pitch value when an irregular heart rate (e.g., arrhythmia) is present (e.g., resulting in lower pitch and higher dose), and setting the pitch at a second pitch value when an irregular heart rate is not present (e.g., resulting in a higher pitch and lower dose). The second pitch value is higher than the first pitch value (which is more conservative).

The disclosed systems and methods provide an adaptive data acquisition process for a helical cardiac CT scan that ensures sufficient Z coverage to minimize artifacts caused by an irregular heart rate during a CT scan and to obtain artifact free images. The disclosed systems and methods are particularly important when one or more abnormalities of the myocardial contraction (e.g., premature cardiac cycle or extended cardiac cycle) are present during the scan. In certain embodiments, the systems and methods expose the subject to a lower dose than typically experienced during a helical cardiac CT scan (when a higher pitch value is utilized due to the absence of an irregular heartbeat prior the helical cardiac CT scan).

Figure 2:
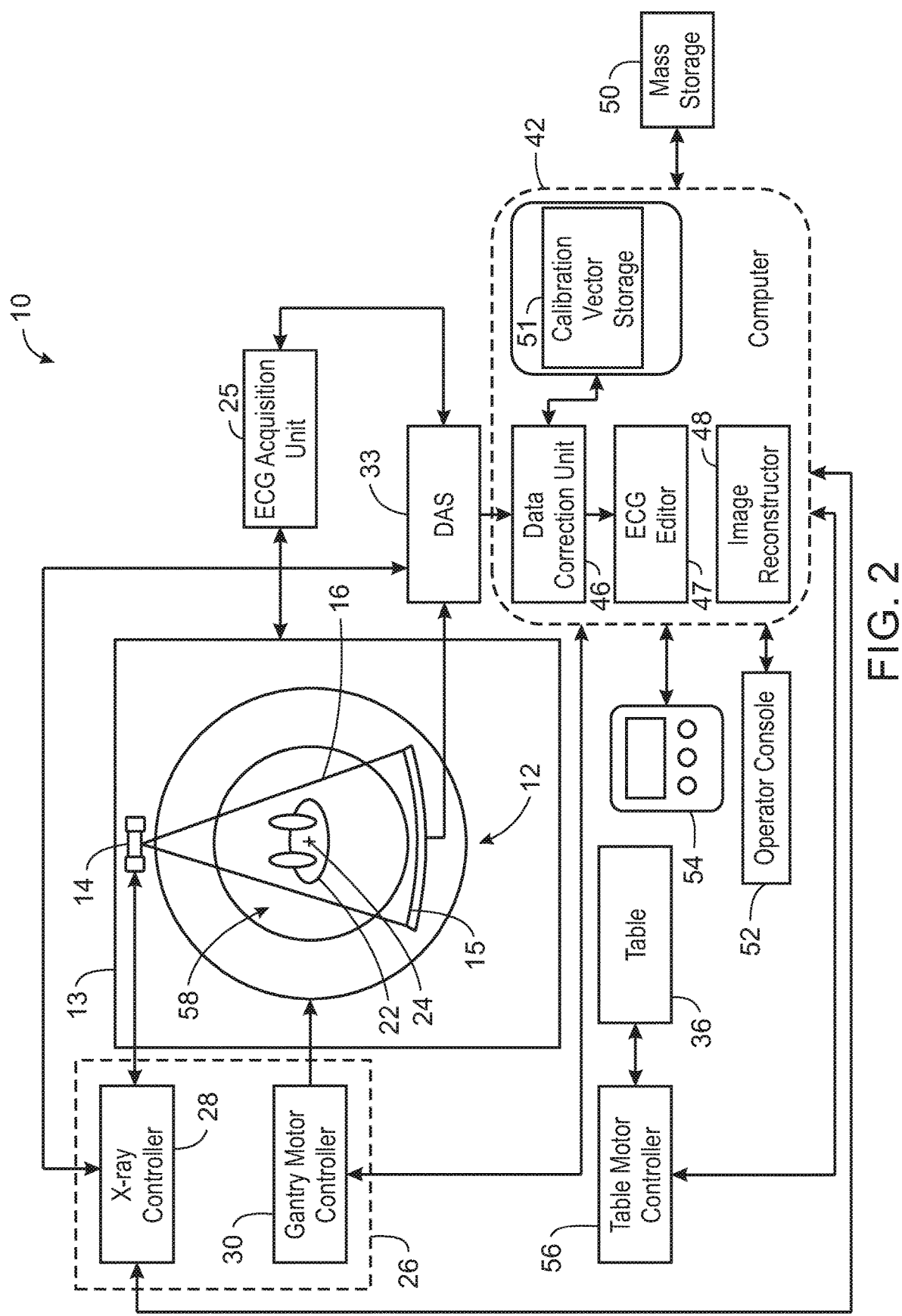
FIG. 2 is a block diagram of the CT imaging system in FIG. 1, in accordance with aspects of the present disclosure.

With the preceding in mind and referring to FIGS. 1 and 2, a CT imaging system 10 is shown, by way of example. The CT imaging system 10 of FIGS. 1 and 2 may be utilized with a dual-modality imaging system (e.g., positron emission tomography (PET)/CT imaging system). The CT imaging system 10 (e.g., CT scanner) includes a gantry 12 coupled having a housing 13 (e.g., gantry housing). The gantry 12 has a rotating component and a stationary component. The gantry 12 has an X-ray source 14 that projects a beam of X-rays 16 toward an X-ray detector assembly or X-ray detector array 15 (e.g., having a plurality of detector modules) on the opposite side of the gantry 12. The X-ray source 14 and the X-ray detector assembly 15 are disposed on the rotating portion of the gantry 12. The X-ray detector assembly 15 is coupled to data acquisition systems (DAS) 33. The plurality of detector modules of the X-ray detector assembly 15 detect the projected X-rays that pass through a patient or subject 22, and DAS 33 converts the data to digital signals for subsequent processing. Each detector module of the X-ray detector assembly 15 in a conventional system produces an analog electrical signal that represents the intensity of an incident X-ray beam and hence the attenuated beam as it passes through the patient 22. During a scan to acquire X-ray projection data, gantry 12 and the components mounted thereon rotate about a center of rotation 24 (e.g., isocenter) so as to collect attenuation data from a multitude of view angles relative to the imaged volume. An electrocardiogram (ECG) acquisition unit 25 is coupled to the DAS 33 and is to provide ECG signals acquired from the patient 22 (e.g., prior to and/or during a scan (e.g., helical cardiac CT scan) from ECG leads coupled to the patient 22 for utilization in the techniques described below. In certain embodiments, a different kind of acquisition system may be utilized to acquire cardiac data of the patient for monitoring for an irregular cardiac cycle for utilization in the disclosed techniques.

Rotation of gantry 12 and the operation of X-ray source 14 are governed by a control mechanism 26 of CT system 10. Control mechanism 26 includes an X-ray controller 28 that provides power and timing signals to the X-ray source 14 and a gantry motor controller 30 that controls the rotational speed and position of gantry 12.

A computer 42 (separate from or a part of the CT imaging system 10) includes a data correction unit 46 for processing or correcting the CT scan data from the DAS 33. The computer 42 also includes an ECG editor 47 for arbitrarily modifying the position of temporal windows (e.g., deletion of short R-R intervals, insertion of additional temporal windows into the middiastolic phase of long R-R intervals, shift of R points, etc.) within the cardiac cycle (of the ECG signal) to enable correction of compensation for artifacts produced by heart rhythm irregularities. The computer 42 also includes an image reconstructor 48. The image reconstructor 48 receives sampled and digitized X-ray data from DAS 33 and performs high-speed reconstruction (taking into account the edited ECG data (if edited)). The reconstructed image is applied as an input to the computer 42, which stores the image in a mass storage device 50. The computer 42 further includes a calibration vector storage 51 (e.g., for storing calibration parameters and calibration protocols for acquiring CT scan data) communicatively coupled to the image reconstructor. Computer 42 also receives commands and scanning parameters from an operator via console 52. An associated display 54 allows the operator to observe the reconstructed image and other data from the computer 42. The operator supplied commands and parameters are used by computer 42 to provide control signals and information to the DAS 33, X-ray controller 28, and gantry motor controller 30. In addition, computer 42 operates a table motor controller 56, which controls a motorized table 36 to position the patient 22 relative to the gantry 12. Particularly, table 36 moves portions of the patient 22 through a gantry opening or bore 58.

The computer 42 include includes processing circuitry. The processing circuitry may be one or more general or application-specific microprocessors. The processing circuitry may be configured to execute instructions stored in a memory to perform various actions. For example, the processing circuitry may be utilized for adaptive data acquisition during a helical cardiac computed tomography (CT) scan session. In particular, the processing circuitry may be configured to provide an adaptive data acquisition process for a helical cardiac CT scan that ensures sufficient Z coverage to minimize artifacts caused by an irregular heart rate during a CT scan and to obtain artifact free images. The processing circuitry may be configured to obtain an electrocardiogram (ECG) signal (e.g., via ECG acquisition unit 25)

from a subject 22 (e.g., patient) during a duration of a helical cardiac CT scan of a heart of the subject 22 with a CT scanner 10 during the helical cardiac CT scan session. The processing circuitry may also be configured to calculate temporal R-R electrocardiogram interval measurements from the ECG signal during the duration of the helical cardiac CT scan. The processing circuitry may further be configured to monitor whether any irregular cardiac cycles (e.g., premature cycle, extended cycle, or both premature cycle and extended cycle) are detected in the temporal R-R electrocardiogram interval measurements during the duration of the helical cardiac CT scan. The processing circuitry may even further be configured to determine during the helical cardiac CT scan whether an initial Z coverage of the helical cardiac CT scan is sufficient for obtaining an artifact free image of the heart at a target phase (e.g., atrial diastole, atrial systole, ventricular diastole, or ventricular systole) when one or more irregular cardiac cycles are detected. Cardiac Z coverage in a helical cardiac CT scan is determined by a width of a CT detector (e.g., X-ray detector assembly 15) and the pitch. The processing circuitry may still further be configured to determine a required Z coverage to obtain the artifact free image of the heart at the target phase when the initial Z coverage is not sufficient. The processing circuitry may yet further be configured to initiate (e.g., automatically) after the helical cardiac CT scan a helical cardiac CT rescan of the heart of the subject 22 with the CT scanner 10 during the helical cardiac CT scan session to obtain the required Z coverage while continuing both to obtain the ECG signal and to monitor for any irregular cardiac cycles. In particular, the helical cardiac CT rescan is targeted to acquire the additional Z coverage needed to meet the required Z coverage.

In certain embodiments, when a helical cardiac CT rescan is performed during the same helical cardiac CT scan session, a table 36 of the CT scanner 10 supporting the subject 22 moves the subject 22 in a first direction (e.g., Z or axial direction) through a bore 58 of a gantry 12 of the CT scanner 10 during the helical cardiac CT scan and moves the subject 22 in a second direction through the bore 58 of the gantry 12 during the helical cardiac CT rescan, where the first direction is opposite the second direction. In certain embodiments, when a helical cardiac CT rescan is performed during the same helical cardiac CT scan session, a table 36 of the CT scanner 10 supporting the subject 22 moves the subject 22 in a same direction through a bore 58 of a gantry 12 of the CT scanner 10 during both the helical cardiac CT scan and the helical cardiac CT rescan.

In certain embodiments (when a helical cardiac CT rescan is conducted), the processing circuitry may be configured to generate one or more reconstructed images based on scan data obtained from both the helical cardiac CT scan and the helical cardiac CT rescan, and to apply motion correction to the one or more reconstructed images utilizing ECG data from the ECG signal. In certain embodiments, the processing circuitry may be configured to generate one or more reconstructed images based on scan data obtained from the helical cardiac CT scan when no irregular cardiac cycles are detected, and to apply motion correction to the one or more reconstructed images utilizing ECG data from the ECG signal. In certain embodiments, the processing circuitry may be configured to generate one or more reconstructed images based on scan data obtained from the helical cardiac CT scan when the initial Z coverage is sufficient, and to apply motion correction to the one or more reconstructed images utilizing ECG data from the ECG signal.

In certain embodiments, the processing circuitry may be configured to obtain the ECG signal from the subject 22 prior the helical cardiac CT scan, and to determine a pitch (e.g., pitch ratio) (i.e., ratio of distance moved by the table 36 (subject 22) in one rotation of the X-ray source 14 (e.g., one 360 degree gantry rotation) divided by the nominal X-ray beam width (e.g., beam collimation)) for the helical cardiac CT scan prior to the helical cardiac CT scan utilizing a heart rate of the subject 22 derived from the ECG signal. In certain embodiments, the processing circuitry is configured to determine the pitch for the helical cardiac CT scan by setting the pitch at a first pitch value when an irregular heart rate (e.g., arrhythmia) is present (e.g., resulting in lower pitch and higher dose), and setting the pitch at a second pitch value when an irregular heart rate is not present (e.g., resulting in higher pitch and lower dose). The second pitch value is higher than the first pitch value (which is more conservative).

FIG. 3 is a schematic diagram of a helical cardiac CT scan. In particular, the subject 22 (e.g., patient) is supported on the table 36 of the CT scanner (e.g., CT scanner 10 in FIG. 1). During the helical cardiac CT scan, the subject 22 is moved (via the table 36) through a bore of the gantry (e.g., along a Z-axis 59) as the X-ray source (e.g., X-ray detector source 14 in FIG. 1) and the X-ray detector (e.g., X-ray detector assembly 15 in FIG. 1) continuously rotate about a chest region 60 of the subject 22 in a helical or spiral pattern 61 to acquire scan data of a heart 62. ECG leads (not shown) may be coupled to the chest region 60 of the subject 22 to acquire ECG signals prior to and during the helical cardiac CT scan.

FIG. 4 is a graph 64 illustrating a corresponding Z coverage (e.g., cardiac Z coverage) for the helical cardiac CT scan in FIG. 3. The graph 64 includes a Y-axis 66 representing time and an X-axis 68 representing cardiac Z coverage. Disposed along the Y-axis 66 is a graph 70 of an ECG signal 72 (relative to time) acquired of the subject 22 during the helical cardiac CT scan. As depicted in the graph 70, the ECG signal 72 lacks any irregular cardiac activity. A plot 74 of the cardiac Z coverage relative to time indicates a consistent pitch during the helical cardiac CT scan.

Figure 5:
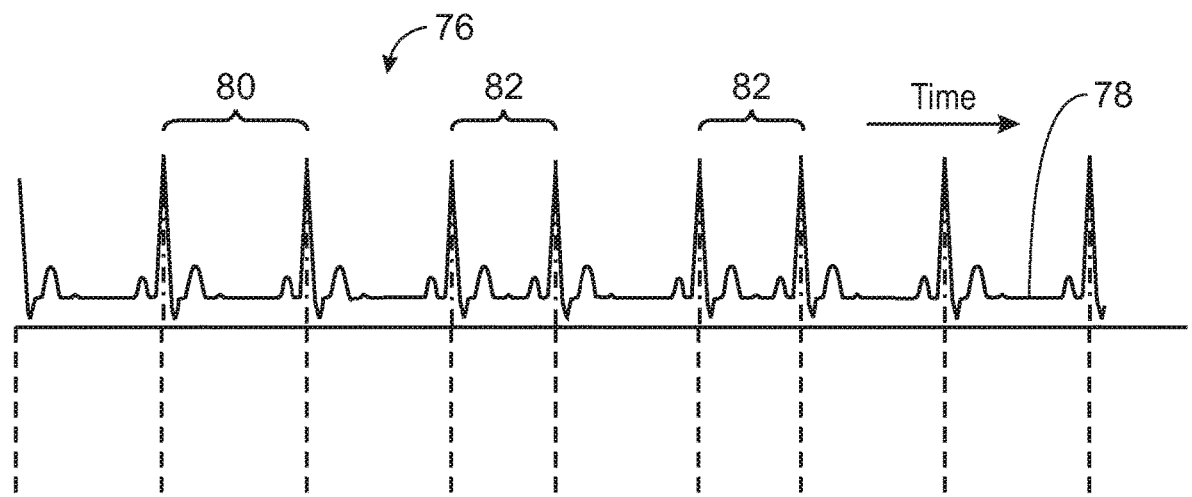
FIG. 5 is a graph of an ECG signal having a premature cardiac cycle present, in accordance with aspects of disclosure.
Figure 6:
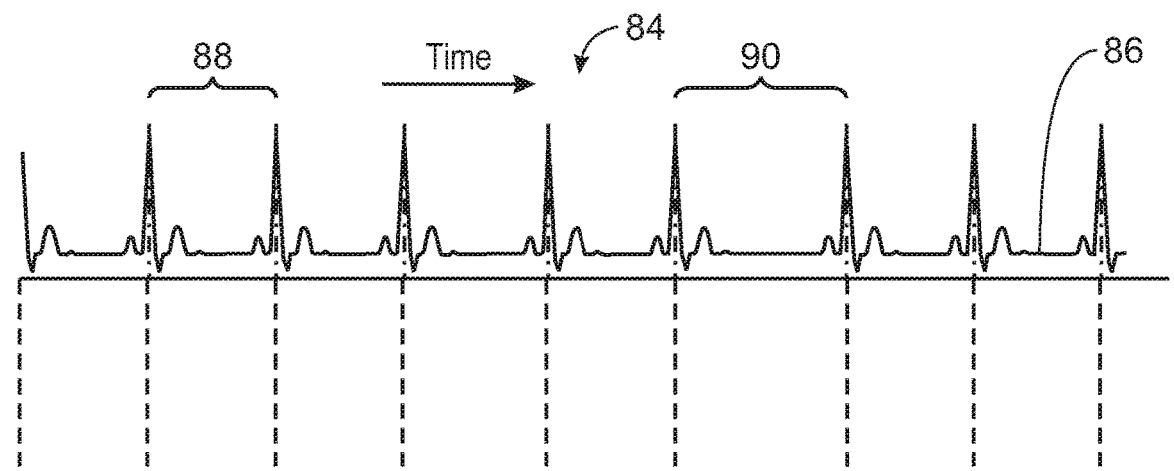
FIG. 6 is a graph of an ECG signal having an extended cardiac cycle present, in accordance with aspects of the present disclosure.

FIGS. 5 and 6 depict examples of irregular cardiac cycles that may be detected utilizing the ECG acquisition unit 25 in FIG. 1 and utilized in the techniques described herein. FIG. 5 is a graph 76 of an ECG signal 78 having a premature cardiac cycle present. The depicted ECG signal 78 is depicted relative to time. The ECG signal 78 includes temporal windows 80 having normal R-R intervals. In addition, the ECG signal 78 includes temporal windows 82 having short R-R intervals indicative of a premature cardiac cycle.

FIG. 6 is a graph 84 of an ECG signal 86 having an extended cardiac cycle present. The depicted ECG signal 86 is depicted relative to time. The ECG signal 86 includes temporal windows 88 having normal R-R intervals. In addition, the ECG signal 86 includes temporal windows 90 having short R-R intervals indicative of an extended cardiac cycle.

Figure 7:
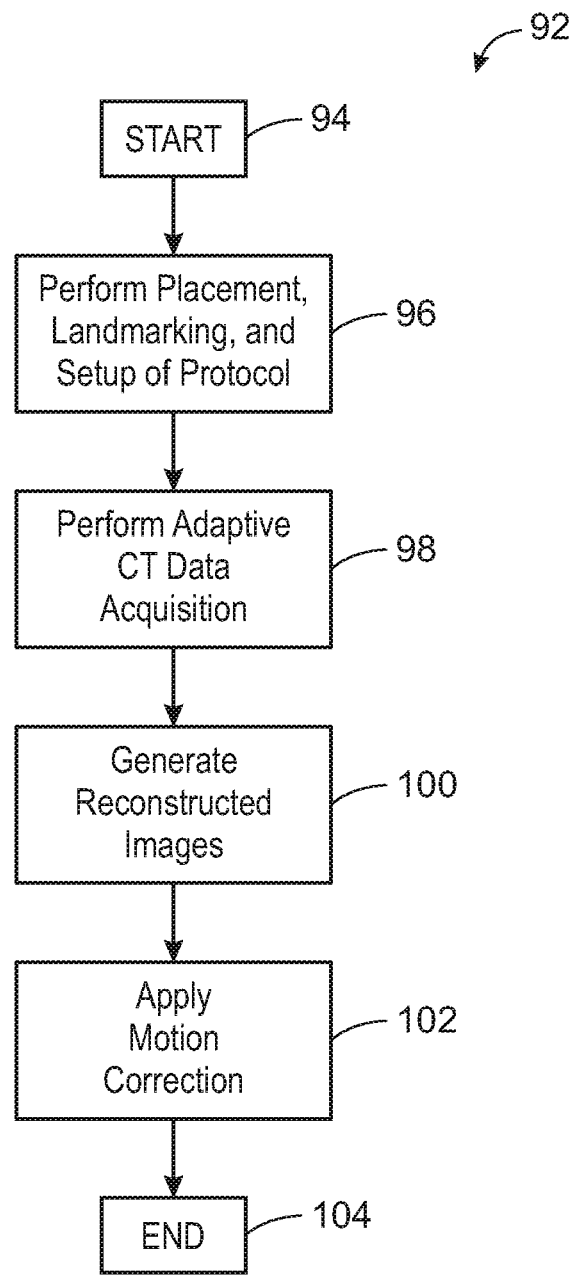
FIG. 7 is a flowchart of a method for adaptive data acquisition during a helical cardiac CT scan session, in accordance with aspects of the present disclosure.

FIG. 7 is a flowchart of a method 92 for adaptive data acquisition during a helical cardiac CT scan session. The method 92 may be performed by one or more components (e.g., processing circuitry) of the CT imaging system 10 in FIGS. 1 and 2. One or more steps of the method 92 may be performed simultaneously and/or in a different order than depicted in FIG. 7.

At the start of the method 92 (block 94), the method 92 includes performing placement of the subject, landmarking, setting up of a protocol for a helical cardiac CT scan session with a CT scanner of the CT imaging system 10 (block 96). The method 92 also includes performing adaptive CT data acquisition (block 98). Performing adaptive CT data acquisition includes monitoring ECG cardiac data obtained of the subject and processing the information in real time (i.e., input data is processed within milliseconds so that it is available virtually immediately as feedback). In particular, R-R peaks are monitored to extract cardiac cycle information. In certain embodiments, the ECG data is obtained during the helical cardiac CT scan. In certain embodiments, the ECG data is obtained both prior to and during the helical cardiac CT scan data. Performing adaptive CT data acquisition also includes, when an irregular cardiac cycle is detected during the helical cardiac CT scan, performing immediately after the native helical cardiac CT a targeted helical cardiac CT rescan to ensure sufficient cardiac Z coverage to enable obtaining artifact free images (i.e., free of artifacts due to an irregular cardiac cycle). In certain embodiments, adaptive CT data acquisition includes calculating temporal R-R electrocardiogram interval measurements from the ECG signal during the duration of the helical cardiac CT scan. In certain embodiments, adaptive CT data acquisition includes monitoring whether any irregular cardiac cycles are detected in the temporal R-R electrocardiogram interval measurements during the duration of the helical cardiac CT scan. In certain embodiments, adaptive CT data acquisition includes determining during the helical cardiac CT scan whether an initial Z coverage of the helical cardiac CT scan is sufficient for obtaining an artifact free image of the heart at a target phase when one or more irregular cardiac cycles are detected. In certain embodiments, adaptive CT data acquisition includes determining a required Z coverage to obtain the artifact free image of the heart at the target phase when the initial Z coverage is not sufficient. In certain embodiments, adaptive CT data acquisition includes initiating after the helical cardiac CT scan a helical cardiac CT rescan of the heart of the subject with the CT scanner during the helical cardiac CT scan session to obtain the required Z coverage while continuing both to obtain the ECG signal and to monitor for any irregular cardiac cycles.

The method 92 further includes generating one or more reconstructed images based on scan data obtained from at least the helical cardiac CT scan (block 100). In certain embodiments, the one or more reconstructed images may be generated based on scan data from both the helical cardiac CT scan data and the targeted helical cardiac CT rescan (when an irregular cardiac cycle was present and the targeted helical cardiac CT rescan was needed). The method 92 even further includes applying motion correction to the one or more reconstructed images to generate one or more motion-corrected images of the heart of subject (block 102). The method 92 then ends (block 104).

Figure 8:
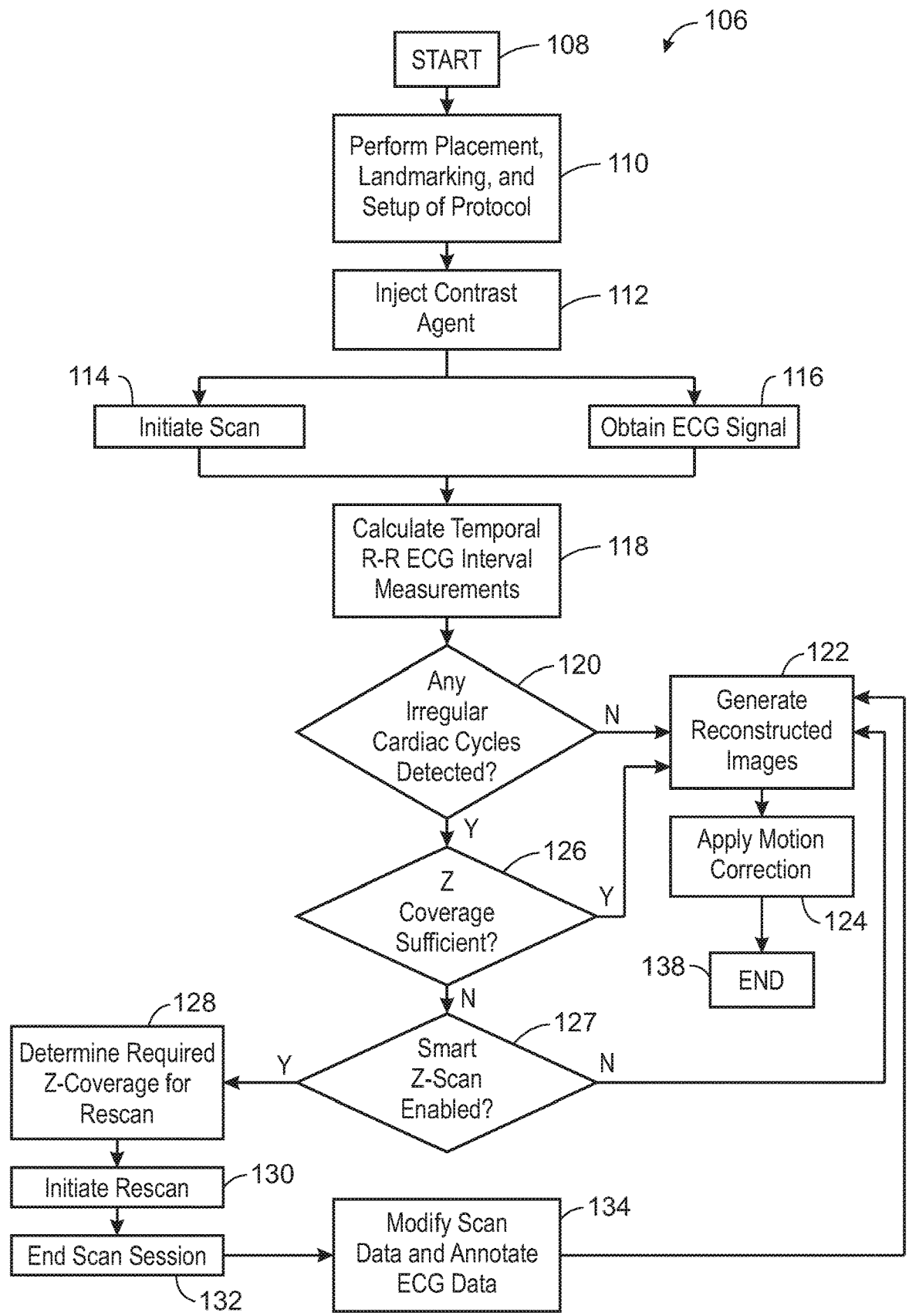
FIG. 8 is a flowchart of a method for adaptive data acquisition during a helical cardiac CT scan session in greater detail, in accordance with aspects of the present disclosure.

FIG. 8 is a flowchart of a method 106 for adaptive data acquisition during a helical cardiac CT scan session. The method 106 may be performed by one or more components (e.g., processing circuitry) of the CT imaging system 10 in FIGS. 1 and 2. One or more steps of the method 106 may be performed simultaneously and/or in a different order than depicted in FIG. 8.

At the start of the method 106 (block 108), the method 106 includes performing placement of the subject, landmarking, setting up of a protocol for a helical cardiac CT scan session with a CT scanner of the CT imaging system 10 (block 110). The method 106 also includes injecting a subject with contrast agent (block 112). The method 106 further includes initiating a helical cardiac CT scan of a heart of a subject with the CT scanner (block 114). The method 106 even further includes obtaining an electrocardiogram (ECG) signal from the subject (block 116). The obtaining of the ECG signal may occur at the same time as the initiation of the helical cardiac CT scan. The ECG signal may be obtained during the duration of the helical cardiac CT scan. In certain embodiments, the method 106 may include beginning to obtain the ECG signal prior to the initiation of the helical cardiac CT scan.

The method 106 includes calculating temporal R-R electrocardiogram interval measurements from the ECG signal during the duration of the helical cardiac CT scan (block 118). The method 106 also includes monitoring whether any irregular cardiac cycles (e.g., premature cycle, extended cycle, or both premature cycle and extended cycle) are detected in the temporal R-R electrocardiogram interval measurements during the duration of the helical cardiac CT scan (block 120).

The method 106 includes generating one or more reconstructed images based on scan data obtained from the helical cardiac CT scan when no irregular cardiac cycles are detected (block 122) and then applying motion correction to the one or more reconstructed images utilizing ECG data from the ECG signal (block 124). The method 106 then ends (block 138).

The method 106 even further includes determining during the helical cardiac CT scan whether an initial Z coverage of the helical cardiac CT scan is sufficient for obtaining an artifact free image of the heart at a target phase (e.g., atrial diastole, atrial systole, ventricular diastole, or ventricular systole) when one or more irregular cardiac cycles are detected (block 126). Z coverage (or cardiac Z coverage) in a helical cardiac CT scan is determined by a width of a CT detector and the pitch. The method 106 yet further includes generating one or more reconstructed images based on scan data obtained from the helical cardiac CT scan when the initial Z-coverage is sufficient (block 122) and then applying motion correction to the one or more reconstructed images utilizing ECG data from the ECG signal (block 124). The method 106 then ends (block 138).

The method 106 even further includes determining if smart Z-scan is enabled when the initial Z coverage is not sufficient (block 126). Smart Z-scan is program or module configured to determine a required Z coverage to obtain the artifact free image of the heart at a target phase and performing a targeted rescan to obtain the required Z coverage. In particular, the helical cardiac CT rescan is targeted to acquire the additional Z coverage needed to meet the required Z coverage. If smart Z-scan is not enabled, the method 106 includes generating one or more reconstructed images based on scan data obtained from the helical cardiac CT scan (block 122) and then applying motion correction to the one or more reconstructed images utilizing ECG data from the ECG signal (block 124). The method 106 then ends (block 138).

The method 106 still further includes determining a required Z coverage (e.g., for a rescan) to obtain the artifact free image of the heart at the target phase when the initial Z coverage is not sufficient and the smart Z-scan is enabled (block 128). The method 106 yet further include initiating (e.g., automatically) after the helical cardiac CT scan a helical cardiac CT rescan (e.g., targeted helical cardiac CT scan) of the heart of the subject with the CT scanner during the helical cardiac CT scan session to obtain the required Z coverage while continuing both to obtain the ECG signal and to monitor for any irregular cardiac cycles (block 130).

In particular, the helical cardiac CT rescan is targeted to acquire the additional Z coverage needed to meet the required Z coverage. The method 106 includes ending the helical cardiac CT scan session (block 132).

The method 106 includes modifying the scan data acquired from both the helical cardiac CT scan and the helical cardiac CT rescan and annotating the ECG data (e.g. utilizing the ECG editor 47 in FIG. 2) (block 134). The method 106 also includes generating one or more reconstructed images based on scan data obtained from both the helical cardiac CT scan and the helical cardiac CT rescan (block 122), and applying motion correction to the one or more reconstructed images utilizing ECG data from the ECG signal (after modification of the scan data and annotation of the ECG data) (block 124). The method 106 then ends (block 138).

Figure 9:
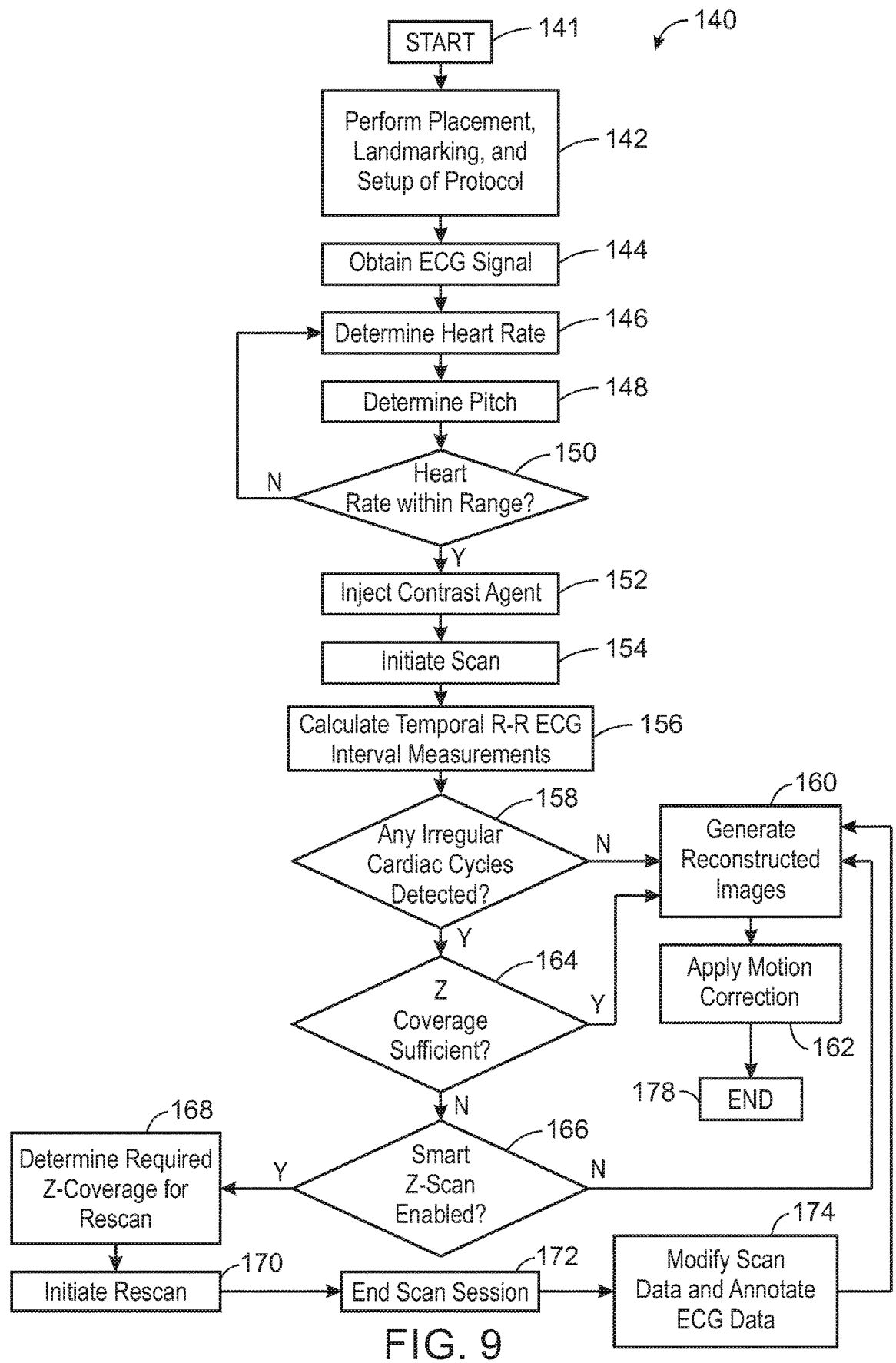
FIG. 9 is a flowchart of a method for adaptive data acquisition during a helical cardiac CT scan session (e.g., having an initial pitch set by heart rate prior to the helical cardiac CT scan), in accordance with aspects of the present disclosure.

FIG. 9 is a flowchart of a method 140 for adaptive data acquisition during a helical cardiac CT scan session. The method 140 may be performed by one or more components (e.g., processing circuitry) of the CT imaging system 10 in FIGS. 1 and 2. One or more steps of the method 140 may be performed simultaneously and/or in a different order than depicted in FIG. 9.

At the start of the method 140 (block 141), the method 140 includes performing placement of the subject, landmarking, setting up of a protocol for a helical cardiac CT scan session with a CT scanner of the CT imaging system 10 (block 142). The method 140 also includes obtaining an ECG signal from the subject prior to the helical cardiac CT scan (and continuously obtaining the ECG signal during the duration of the helical cardiac CT scan session) (block 144). The method 140 further includes determining a heart rate from the ECG signal (block 146). The method 140 even further includes determining a pitch for the helical cardiac CT scan prior to the helical cardiac CT scan utilizing the determined heart rate of the subject derived from the ECG signal (block 148). Determining the pitch for the helical cardiac CT scan includes setting the pitch at a first pitch value when an irregular heart rate (e.g., arrhythmia) is present, and setting the pitch at a second pitch value when an irregular heart rate is not present. The second pitch value is higher than the first pitch value (which is more conservative). The method 140 still further includes determining whether the heart rate is within a predetermined range (block 150). If the heart rate is not within the predetermined range, the method 140 returns to determining the heart rate (block 146) and determining a pitch (block 148). If the heart rate is within the predetermined range, the method 140 includes injecting a subject with contrast agent (block 152).

The method 140 further includes initiating a helical cardiac CT scan of a heart of a subject with the CT scanner (block 154). The method 140 includes calculating temporal R-R electrocardiogram interval measurements from the ECG signal during the duration of the helical cardiac CT scan (block 156). The method 140 also includes monitoring whether any irregular cardiac cycles (e.g., premature cycle, extended cycle, or both premature cycle and extended cycle) are detected in the temporal R-R electrocardiogram interval measurements during the duration of the helical cardiac CT scan (block 158).

The method 140 includes generating one or more reconstructed images based on scan data obtained from the helical cardiac CT scan when no irregular cardiac cycles are detected (block 160) and then applying motion correction to the one or more reconstructed images utilizing ECG data from the ECG signal (block 162). The method 140 then ends (block 178).

The method 140 even further includes determining during the helical cardiac CT scan whether an initial Z coverage of the helical cardiac CT scan is sufficient for obtaining an artifact free image of the heart at a target phase (e.g., atrial diastole, atrial systole, ventricular diastole, or ventricular systole) when one or more irregular cardiac cycles are detected (block 164). Z coverage (or cardiac Z coverage) in a helical cardiac CT scan is determined by a width of a CT detector and the pitch. The method 140 yet further includes generating one or more reconstructed images based on scan data obtained from the helical cardiac CT scan when the initial Z-coverage is sufficient (block 160) and then applying motion correction to the one or more reconstructed images utilizing ECG data from the ECG signal (block 162). The method 140 then ends (block 178).

The method 140 even further includes determining if smart Z-scan is enabled when the initial Z coverage is not sufficient (block 166). Smart Z-scan is program or module configured to determine a required Z coverage to obtain the artifact free image of the heart at a target phase and performing a targeted rescan to obtain the required Z coverage. In particular, the helical cardiac CT rescan is targeted to acquire the additional Z coverage needed to meet the required Z coverage. If smart Z-scan is not enabled, the method 140 includes generating one or more reconstructed images based on scan data obtained from the helical cardiac CT scan (block 160) and then applying motion correction to the one or more reconstructed images utilizing ECG data from the ECG signal (block 162). The method 140 then ends (block 178).

The method 140 still further includes determining a required Z coverage (e.g., for a rescan) to obtain the artifact free image of the heart at the target phase when the initial Z coverage is not sufficient and the smart Z-scan is enabled (block 168). The method 140 yet further include initiating (e.g., automatically) after the helical cardiac CT scan a helical cardiac CT rescan (e.g., targeted helical cardiac CT scan) of the heart of the subject with the CT scanner during the helical cardiac CT scan session to obtain the required Z coverage while continuing both to obtain the ECG signal and to monitor for any irregular cardiac cycles (block 170). In particular, the helical cardiac CT rescan is targeted to acquire the additional Z coverage needed to meet the required Z coverage. The method 140 includes ending the helical cardiac CT scan session (block 172).

The method 140 includes modifying the scan data acquired from both the helical cardiac CT scan and the helical cardiac CT rescan and annotating the ECG data (e.g. utilizing the ECG editor 47 in FIG. 2) (block 174). The method 140 also includes generating one or more reconstructed images based on scan data obtained from both the helical cardiac CT scan and the helical cardiac CT rescan (block 162), and applying motion correction to the one or more reconstructed images utilizing ECG data from the ECG signal (after modification of the scan data and annotation of the ECG data) (block 162). The method 140 then ends (block 178).

Figure 10:
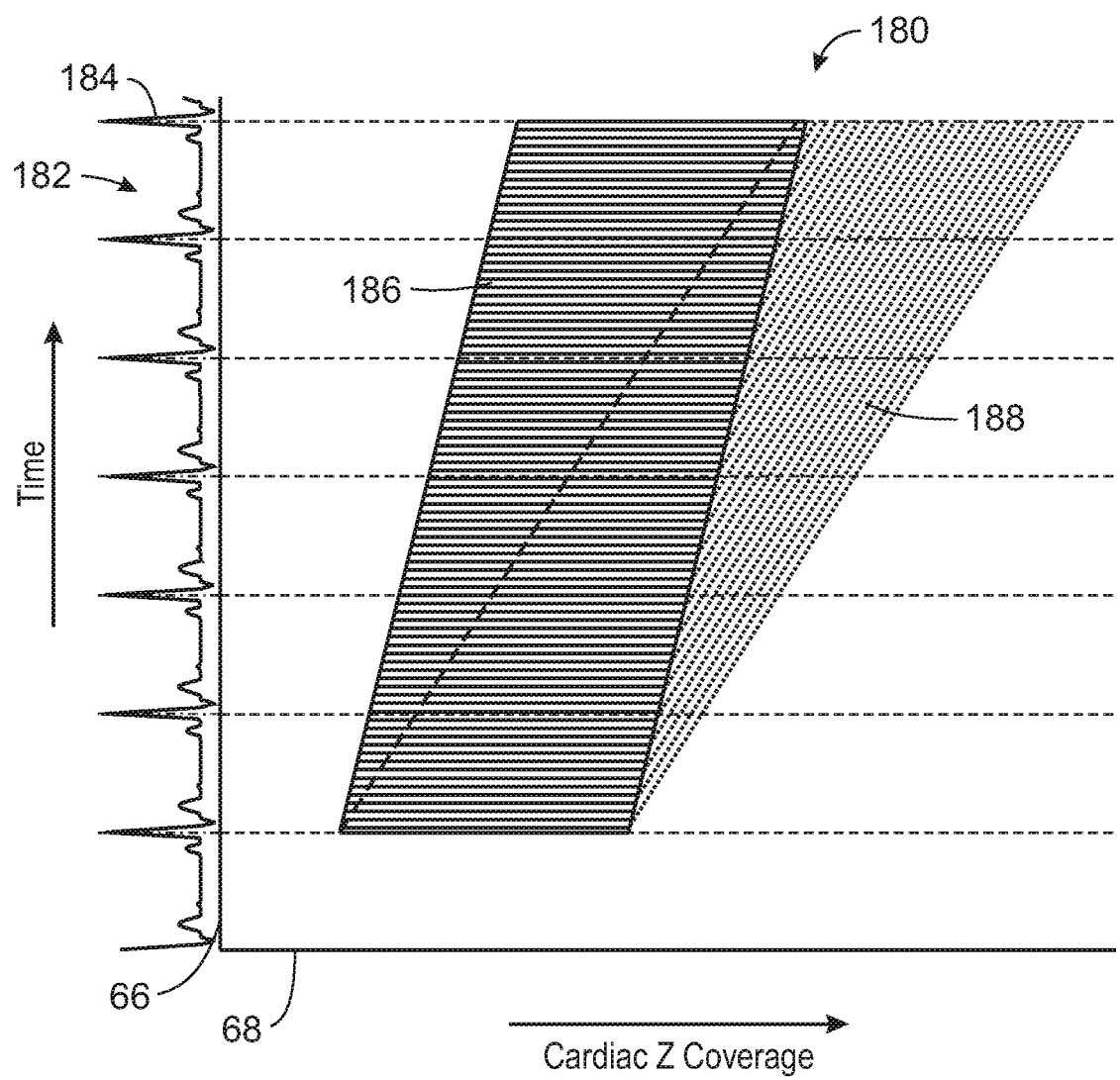
FIG. 10 is a graph illustrating a change in pitch values relative to cardiac Z coverage, in accordance with aspects of the present disclosure.

FIG. 10 is a graph 180 illustrating a change in pitch values relative to cardiac Z coverage. The graph 180 includes a Y-axis 66 representing time and an X-axis 68 representing cardiac Z coverage. Disposed along the Y-axis 66 is a graph 182 of an ECG signal 184 (relative to time) acquired of the subject during the helical cardiac CT scan. A plot 186 of the cardiac Z coverage relative to time indicates a first pitch value (e.g. lower and more conservative pitch value) that may be utilized when an irregular heart rate (e.g., arrhythmia) is detected in the ECG data prior to the helical cardiac CT scan. A plot 188 of the cardiac Z coverage relative to time indicate a second pitch value (e.g., higher pitch value) when an irregular heart rate is not detected prior to the helical cardiac CT scan.

Figure 11:
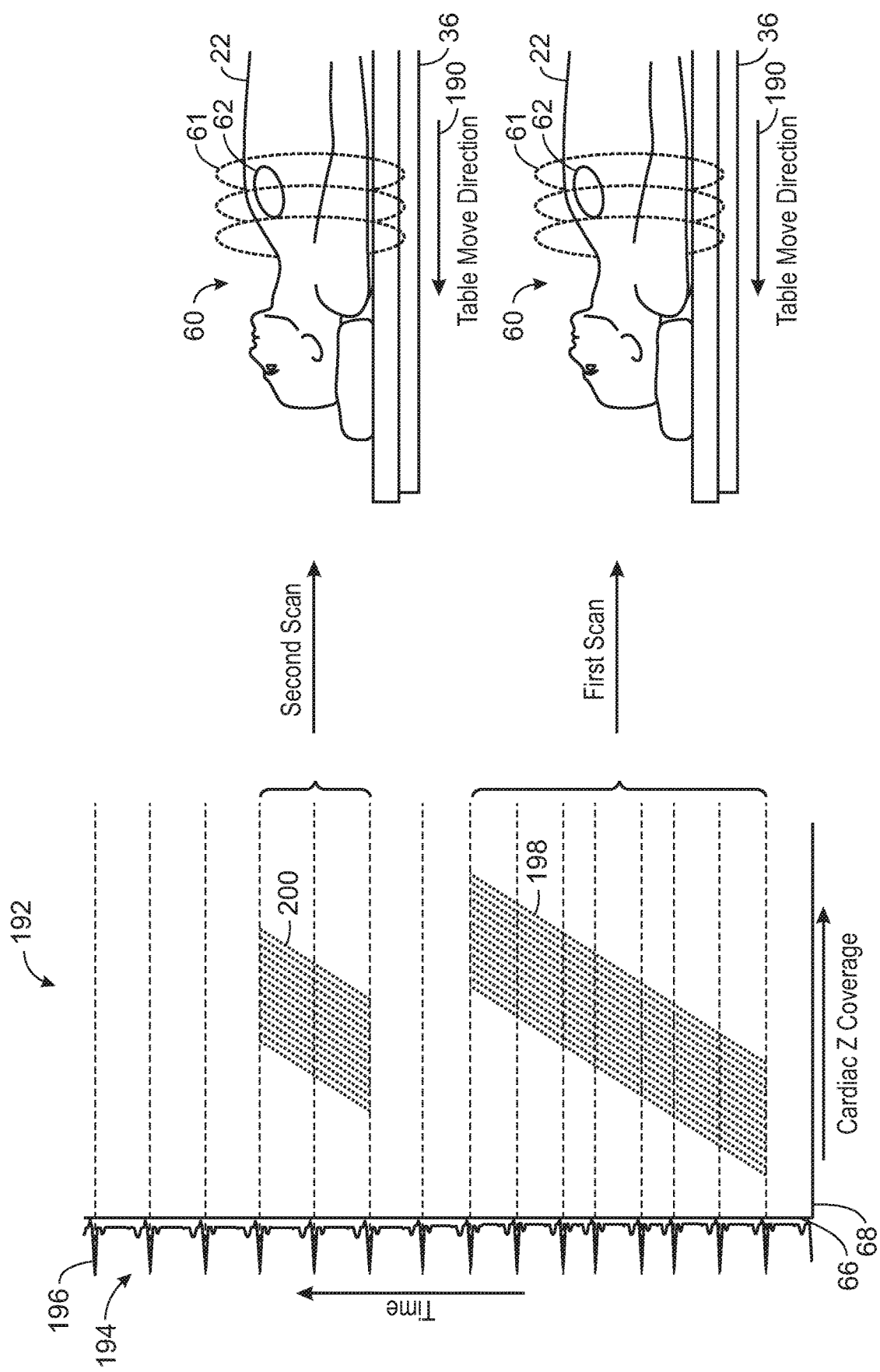
FIG. 11 is a schematic diagram illustrating cardiac Z coverage relative to a helical cardiac CT scan and a helical cardiac CT rescan (e.g., with the helical cardiac CT scan and the helical cardiac CT rescan occurring in a same direction) during a same helical cardiac CT scan session, in accordance with aspects of the present disclosure.

FIG. 11 is a schematic diagram illustrating cardiac Z coverage relative to a helical cardiac CT scan and a helical cardiac CT rescan (e.g., with the helical cardiac CT scan and the helical cardiac CT rescan occurring in a same direction) during a same helical cardiac CT scan session (e.g., smart Z-scan). In particular, the subject 22 (e.g., patient) is supported on the table 36 of the CT scanner (e.g., CT scanner 10 in FIG. 1). During the helical cardiac CT scan (e.g., first scan) and the targeted helical cardiac CT rescan (e.g., second scan), the subject 22 is moved (via the table) through a bore of the gantry (e.g., along a Z-axis) as the X-ray source (e.g., X-ray detector source 14 in FIG. 1) and the X-ray detector (e.g., X-ray detector assembly 15 in FIG. 1) continuously rotates about a chest region 60 of the subject 22 in a helical or spiral pattern 61 to acquire scan data of a heart 62. The table 36 of the CT scanner supporting the subject 22 moves the subject 22 in a same direction 190 through a bore of a gantry of the CT scanner during both the helical cardiac CT scan (e.g., first scan) and the helical cardiac CT rescan (e.g., second scan). FIG. 11 includes a graph 192 having a Y-axis 66 representing time and an X-axis 68 representing cardiac Z coverage. Disposed along the Y-axis 66 is a graph 194 of an ECG signal 196 (relative to time) acquired of the subject during both the helical cardiac CT scan and the helical cardiac CT rescan. Plot 198 represents the cardiac Z coverage relative to time for the helical cardiac CT scan. Plot 200 represents the cardiac Z coverage relative to time for the helical cardiac CT rescan. The additional cardiac Z coverage in plot 200 provides the additional cardiac Z coverage needed to obtain the required cardiac Z coverage to generate an artifact free image of the heart at target phase.

Figure 12:
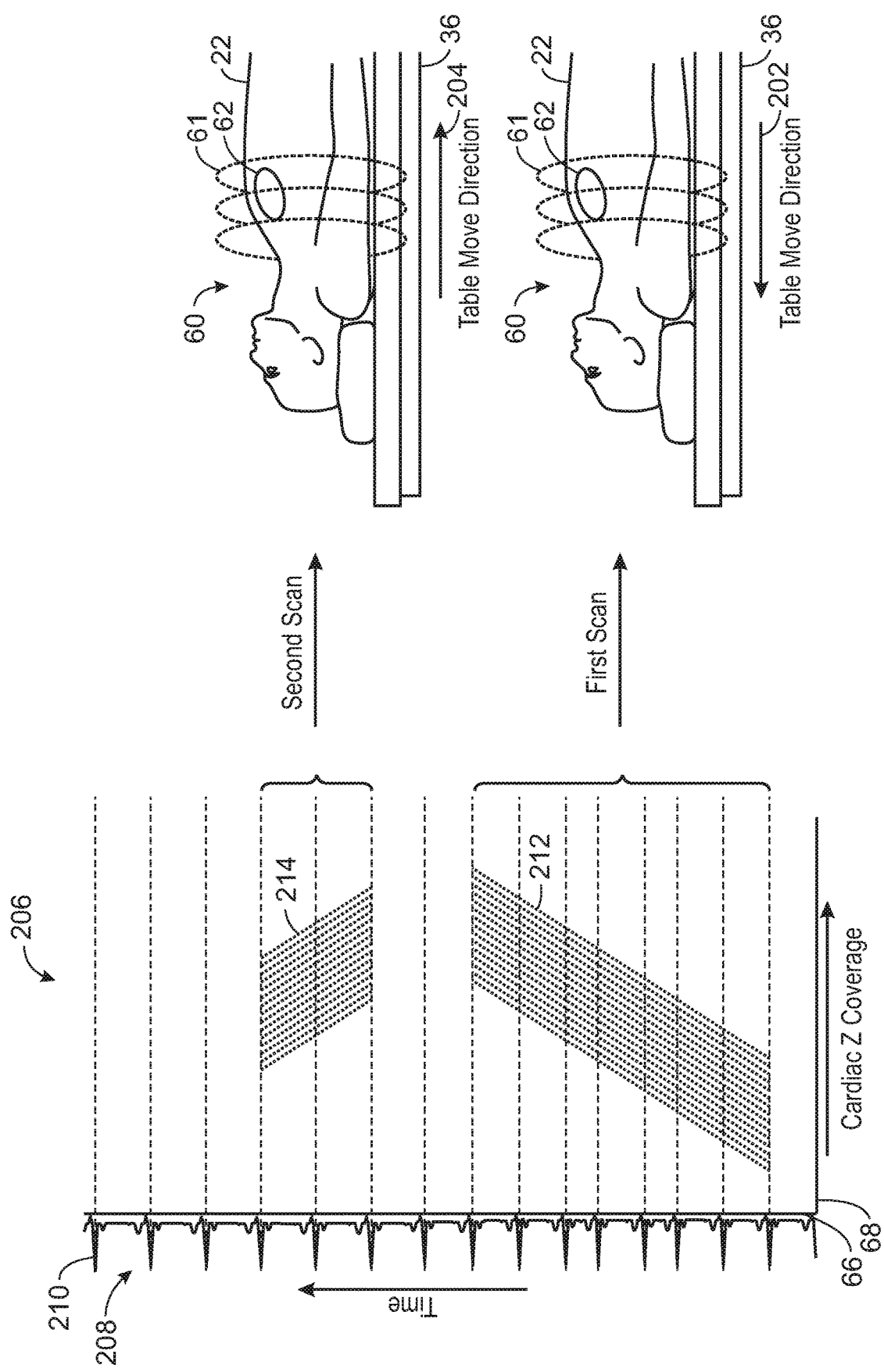
FIG. 12 is a schematic diagram illustrating cardiac Z coverage relative to a helical cardiac CT scan and a helical cardiac CT rescan (e.g., with the helical cardiac CT scan and the helical cardiac CT rescan occurring in different directions) during a same helical cardiac CT scan session, in accordance with aspects of the present disclosure.

FIG. 12 is a schematic diagram illustrating cardiac Z coverage relative to a helical cardiac CT scan and a helical cardiac CT rescan (e.g., with the helical cardiac CT scan and the helical cardiac CT rescan occurring in different directions) during a same helical cardiac CT scan session (e.g., smart Z-scan). In particular, the subject 22 (e.g., patient) is supported on the table 36 of the CT scanner (e.g., CT scanner 10 in FIG. 1). During the helical cardiac CT scan (e.g., first scan) and the targeted helical cardiac CT rescan (e.g., second scan), the subject 22 is moved (via the table 36) through a bore of the gantry (e.g., along a Z-axis) as the X-ray source (e.g., X-ray detector source 14 in FIG. 1) and the X-ray detector (e.g., X-ray detector assembly 15 in FIG. 1) continuously rotate about a chest region 60 of the subject 22 in a helical or spiral pattern 61 to acquire scan data of a heart 62. As depicted, the table 36 of the CT scanner supporting the subject 22 moves the subject 22 in a first direction 202 through a bore of a gantry of the CT scanner during the helical cardiac CT scan (e.g., first scan). The table 36 of the CT scanner supporting the subject 22 moves the subject 22 in a second direction 204 through the bore of the gantry of the CT scanner during the helical cardiac CT rescan (e.g., second scan). The first direction 202 is opposite the second direction 204. FIG. 12 includes a graph 206 having a Y-axis 66 representing time and an X-axis 68 representing cardiac Z coverage. Disposed along the Y-axis 66 is a graph 208 of an ECG signal 210 (relative to time) acquired of the subject during both the helical cardiac CT scan and the helical cardiac CT rescan. Plot 212 represents the cardiac Z coverage relative to time for the helical cardiac CT scan. Plot 214 represents the cardiac Z coverage relative to time for the helical cardiac CT rescan. The additional cardiac Z coverage in plot 214 provides the additional cardiac Z coverage needed to obtain the required cardiac Z coverage to generate an artifact free image of the heart at target phase.

Technical effects of the disclosed embodiments include providing an adaptive data acquisition process for a helical cardiac CT scan that ensures sufficient Z coverage to minimize artifacts caused by an irregular heart rate during a CT scan and to obtain artifact free images. The disclosed systems and methods are particularly important when one or more abnormalities of the myocardial contraction (e.g., premature cardiac cycle or extended cardiac cycle) are present during the scan. Technical effects of the disclosed embodiments also include exposing the subject to a lower radiation dose than typically experienced during a helical cardiac CT scan (when a higher pitch value is utilized due to the absence of an irregular heartbeat prior the helical cardiac CT scan).

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for adaptive data acquisition during a helical cardiac computed tomography (CT) scan session, comprising:

obtaining, at a processor, an electrocardiogram (ECG) signal from a subject during a duration of a helical cardiac CT scan of a heart of the subject with a CT scanner during the helical cardiac CT scan session;

calculating, via the processor, temporal R-R electrocardiogram interval measurements from the ECG signal during the duration of the helical cardiac CT scan;

monitoring, via the processor, whether any irregular cardiac cycles are detected in the temporal R-R electrocardiogram interval measurements during the duration of the helical cardiac CT scan;

determining, via the processor, during the helical cardiac CT scan whether an initial Z coverage of the helical cardiac CT scan is sufficient for obtaining an artifact free image of the heart at a target phase when one or more irregular cardiac cycles are detected;

determining, via the processor, a required Z coverage to obtain the artifact free image of the heart at the target phase when the initial Z coverage is not sufficient; and initiating, via the processor, after the helical cardiac CT scan a helical cardiac CT rescan of the heart of the subject with the CT scanner during the helical cardiac CT scan session to obtain the required Z coverage while continuing both to obtain the ECG signal and to monitor for any irregular cardiac cycles.

2. The computer-implemented method of claim 1, wherein the irregular cardiac cycles comprise a premature cardiac cycle, an extended cardiac cycle, or both the premature cardiac cycle and the extended cardiac cycle.

3. The computer-implemented method of claim 1, further comprising generating, via the processor, one or more reconstructed images based on scan data obtained from both the helical cardiac CT scan and the helical cardiac CT rescan.

4. The computer-implemented method of claim 3, further comprising applying, via the processor, motion correction to the one or more reconstructed images utilizing ECG data from the ECG signal.

5. The computer-implemented method of claim 1, further comprising generating, via the processor, one or more reconstructed images based on scan data obtained from the helical cardiac CT scan when no irregular cardiac cycles are detected, and applying, via the processor, motion correction to the one or more reconstructed images utilizing ECG data from the ECG signal.

6. The computer-implemented method of claim 1, further comprising generating, via the processor, one or more reconstructed images based on scan data obtained from the helical cardiac CT scan when the initial Z coverage is sufficient, and applying, via the processor, motion correction to the one or more reconstructed images utilizing ECG data from the ECG signal.

7. The computer-implemented method of claim 1, further comprising obtaining, at the processor, the ECG signal from the subject prior to the helical cardiac CT scan, and determining, via the processor, a pitch for the helical cardiac CT scan prior to the helical cardiac CT scan utilizing a heart rate of the subject derived from the ECG signal.

8. The computer-implemented method of claim 7, wherein determining the pitch for the helical cardiac CT scan comprises setting the pitch at a first pitch value when an irregular heart rate is present, and setting the pitch at a second pitch value when an irregular heart rate is not present, and wherein the second pitch value is higher than the first pitch value.

9. The computer-implemented method of claim 1, wherein a table of CT scanner supporting the subject moves the subject in a first direction through a bore of a gantry of the CT scanner during the helical cardiac CT scan and moves the subject in a second direction through the bore of the gantry during the helical cardiac CT rescan, and wherein the first direction is opposite the second direction.

10. The computer-implemented method of claim 1, wherein a table of CT scanner supporting the subject moves the subject in a same direction through a bore of a gantry of the CT scanner during both the helical cardiac CT scan and the helical cardiac CT rescan.

11. A system for adaptive data acquisition during a helical cardiac computed tomography (CT) scan session, comprising:
a memory encoding processor-executable routines;
a processor configured to access the memory and to execute the processor-executable routines, wherein the processor-executable routines, when executed by the processor, cause the processor to:
obtain an electrocardiogram (ECG) signal from a subject during a duration of a helical cardiac CT scan of a heart of the subject with a CT scanner during the helical cardiac CT scan session;
calculate temporal R-R electrocardiogram interval measurements from the ECG signal during the duration of the helical cardiac CT scan;
monitor whether any irregular cardiac cycles are detected in the temporal R-R electrocardiogram interval measurements during the duration of the helical cardiac CT scan;
determine during the helical cardiac CT scan whether an initial Z coverage of the helical cardiac CT scan is sufficient for obtaining an artifact free image of the heart at a target phase when one or more irregular cardiac cycles are detected;
determine a required Z coverage to obtain the artifact free image of the heart at the target phase when the initial Z coverage is not sufficient; and
initiate after the helical cardiac CT scan a helical cardiac CT rescan of the heart of the subject with the CT scanner during the helical cardiac CT scan session to obtain the required Z coverage while continuing both to obtain the ECG signal and to monitor for any irregular cardiac cycles.

12. The system of claim 11, wherein the irregular cardiac cycles comprise a premature cardiac cycle, an extended cardiac cycle, or both the premature cardiac cycle and the extended cardiac cycle.

13. The system of claim 11, wherein the processor-executable routines, when executed by the processor, further cause the processor to generate one or more reconstructed images based on scan data obtained from both the helical cardiac CT scan and the helical cardiac CT rescan, and to apply motion correction to the one or more reconstructed images utilizing ECG data from the ECG signal.

14. The system of claim 11, wherein the processor-executable routines, when executed by the processor, further cause the processor to generate one or more reconstructed images based on scan data obtained from the helical cardiac CT scan when no irregular cardiac cycles are detected, and to apply motion correction to the one or more reconstructed images utilizing ECG data from the ECG signal.

15. The system of claim 11, wherein the processor-executable routines, when executed by the processor, further cause the processor to generate one or more reconstructed images based on scan data obtained from the helical cardiac CT scan when the initial Z coverage is sufficient, and to apply motion correction to the one or more reconstructed images utilizing ECG data from the ECG signal.

16. The system of claim 11, wherein the processor-executable routines, when executed by the processor, further cause the processor to obtain the ECG signal from the subject prior to the helical cardiac CT scan, and to determine a pitch for the helical cardiac CT scan prior to the helical cardiac CT scan utilizing a heart rate of the subject derived from the ECG signal.

17. The system of claim 16, wherein determining the pitch for the helical cardiac CT scan comprises setting the pitch at a first pitch value when an irregular heart rate is present, and setting the pitch at a second pitch value when an irregular heart rate is not present, and wherein the second pitch value is higher than the first pitch value.

18. The system of claim 11, wherein a table of CT scanner supporting the subject moves the subject in a first direction through a bore of a gantry of the CT scanner during the helical cardiac CT scan and moves the subject in a second direction through the bore of the gantry during the helical cardiac CT rescan, and wherein the first direction is opposite the second direction.

19. The system of claim 11, wherein a table of CT scanner supporting the subject moves the subject in a same direction through a bore of a gantry of the CT scanner during both the helical cardiac CT scan and the helical cardiac CT rescan.

20. A non-transitory computer-readable medium, the non-transitory computer-readable medium comprising processor-executable code that when executed by a processor, causes the processor to:

obtain an electrocardiogram (ECG) signal from a subject during a duration of a helical cardiac computed tomography (CT) scan of a heart of the subject with a CT scanner during a helical cardiac CT scan session;

calculate temporal R-R electrocardiogram interval measurements from the ECG signal during the duration of the helical cardiac CT scan;

monitor whether any irregular cardiac cycles are detected in the temporal R-R electrocardiogram interval measurements during the duration of the helical cardiac CT scan;

determine during the helical cardiac CT scan whether an initial Z coverage of the helical cardiac CT scan is sufficient for obtaining an artifact free image of the heart at a target phase when one or more irregular cardiac cycles are detected;

determine a required Z coverage to obtain the artifact free image of the heart at the target phase when the initial Z coverage is not sufficient; and initiate after the helical cardiac CT scan a helical cardiac CT rescan of the heart of the subject with the CT scanner during the helical cardiac CT scan session to obtain the required Z coverage while continuing both to obtain the ECG signal and to monitor for any irregular cardiac cycles.

* * * * *